(12) United States Patent
Faerber et al.

(10) Patent No.: US 9,223,829 B2
(45) Date of Patent: Dec. 29, 2015

(54) INTERDISTINCT OPERATOR

(75) Inventors: Franz Faerber, Walldorf (DE);
Christian Bensberg, Heidelberg (DE);
Lars Fricke, Worms (DE)

(73) Assignee: SAP SE, Walldorf (DE)

( * ) Notice: Subject to any disclaimer, the term of this patent is extended or adjusted under 35 U.S.C. 154(b) by 485 days.

(21) Appl. No.: 12/982,767

(22) Filed: Dec. 30, 2010

(65) Prior Publication Data
US 2012/0011133 A1    Jan. 12, 2012

Related U.S. Application Data

(60) Provisional application No. 61/363,304, filed on Jul. 12, 2010.

(51) Int. Cl.
*G06F 17/30* (2006.01)

(52) U.S. Cl.
CPC ...... *G06F 17/30466* (2013.01); *G06F 17/3033* (2013.01); *G06F 17/30445* (2013.01)

(58) Field of Classification Search
CPC .................................................. G06F 17/3033
USPC ................. 707/706, 713, 714, 722, 736, 752, 707/754–758, 781, 999.002–999.003
See application file for complete search history.

(56) References Cited

U.S. PATENT DOCUMENTS

| | | | |
|---|---|---|---|
| 6,430,550 B1* | 8/2002 | Leo et al. ...................... | 707/623 |
| 2003/0126367 A1* | 7/2003 | Revilla et al. ................. | 711/122 |
| 2009/0228433 A1* | 9/2009 | Aguilar Saborit et al. ....... | 707/2 |
| 2013/0254183 A1* | 9/2013 | Gorelik et al. ................ | 707/714 |

* cited by examiner

*Primary Examiner* — Syling Yen
(74) *Attorney, Agent, or Firm* — Mintz Levin Cohn Ferris Glovsky and Popeo, P.C.

(57) ABSTRACT

A computer-implemented system and method for performing distinct operations on multiple tables of shared memory of parallel computing environments are disclosed. A distinct operation is executed on each table of a plurality of tables, each distinct operation eliminating duplicate data from each table, the executing creating a hierarchy of table pairs and distinct results, the distinct results comprising a reduced row set for each table. Duplicates on each reduced row set are detected to complete the distinct operation on the plurality of tables.

17 Claims, 6 Drawing Sheets

| Product | Country | Revenue |
|---|---|---|
| Car | USA | 1,000 |
| Car | France | 1,500 |
| Boat | USA | 3,000 |
| Car | Germany | 500 |
| Bike | France | 100 |
| Boat | Germany | 2,600 |
| Car | USA | 1,300 |

Table 1: Sample Fact Table

| Product | Country | Revenue |
|---------|---------|---------|
| Car | USA | 1,000 |
| Car | France | 1,500 |
| Boat | USA | 3,000 |
| Car | Germany | 500 |
| Bike | France | 100 |
| Boat | Germany | 2,600 |
| Car | USA | 1,300 |

Table 1: Sample Fact Table

FIG. 1

INTERDISTINCT OPERATOR

CROSS REFERENCE TO RELATED APPLICATIONS

This application claims the benefit of priority under 35 U.S.C. §119 to U.S. Provisional Patent Application Ser. No. 61/363,304, filed on Jul. 12, 2010, entitled, "Hash-Map, Aggregation, Distinct and Join in Parallel Computation Environments with Shared Memory", the entire disclosures of which is incorporated by reference herein.

BACKGROUND

This disclosure relates generally to parallel computing environments and distinct operations performed on multiple tables of shared memory of parallel computing environments.

Computer processor design has become increasingly influenced by certain physical limits, like heat production, signal propagation delay, transistor size, and bandwidth of communication channels. Roughly since 2006, processor frequency (a measure for the computation power of a processor) has not significantly increased. Therefore, as an alternative to increase computation power, chip vendors began to put multiple computation units (so-called "cores") on a single chip, in what is known as "multi-core processors". Further, multiple chips are switched together on a single computer. On such a computer, all of the cores on these processors can access the main memory (known as "shared memory" or "shared memory architecture").

As a result of these new hardware developments, software vendors can no longer rely on frequency-based performance improvements. Instead, they have to parallelize their software to scale with the number of available processor cores on a computer. Parallelization is difficult, however, especially for operations that were originally designed for single core or single chip computing systems.

One such operation is called "relational distinct." The relational distinct operation eliminates duplicates from a table. Duplicates are defined based on the values of a set of columns. Two rows with the same values on these columns are duplicates. For example, as illustrated in FIG. 1, the distinct operation performed on Table 1 on column "Product" would return a table containing the three rows: Car, Boat, and Bike. The term "distinct columns" refers to the columns on which the distinct operation is defined.

SUMMARY

In general, this document discloses a computer-implemented system and method for performing distinct operations on multiple tables of shared memory of parallel computing environments.

In one aspect, a computer-implemented method includes executing a distinct operation on each table of a plurality of tables. Each distinct operation eliminates duplicate data from each table, creating a hierarchy of table pairs and distinct results. The distinct results include a reduced row set for each table. The method further includes detecting duplicates on each reduced row set to complete the distinct operation on the plurality of tables.

Articles are also described that comprise a tangibly embodied machine-readable medium operable to cause one or more machines (e.g., computers, etc.) to result in operations described herein. Similarly, computer systems are also described that may include a processor and a memory coupled to the processor. The memory may include one or more programs that cause the processor to perform one or more of the operations described herein.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

FIG. 1 illustrates a table on which a distinct operation can be performed.

Like reference symbols in the various drawings indicate like elements.

DETAILED DESCRIPTION

This document describes relational distinct operations performed on multiple tables in a parallel computing environment.

Figure 2:
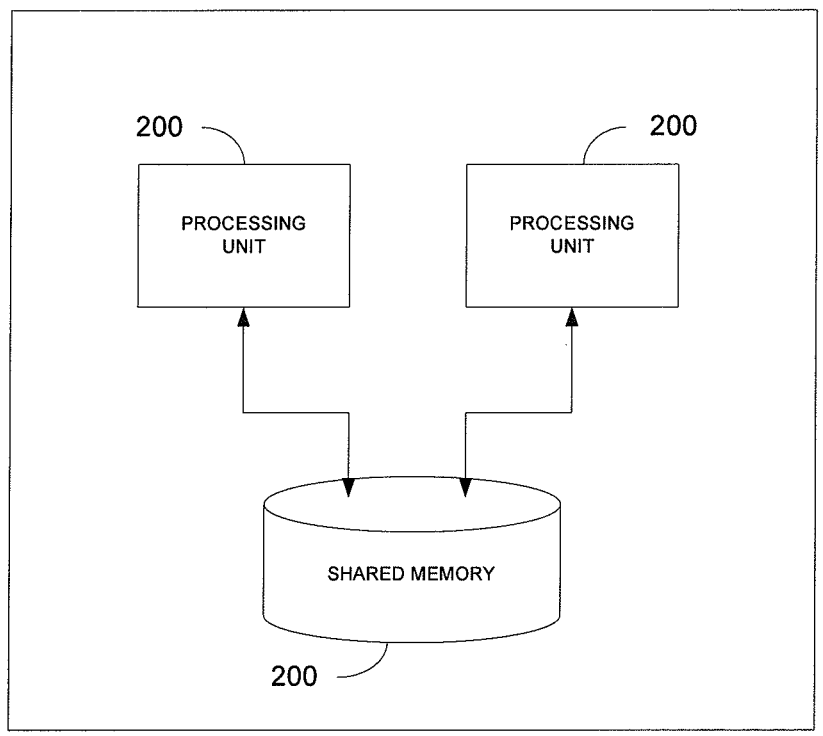
FIG. 2 illustrates a parallel computation environment with a shared memory.

FIG. 2 illustrates a parallel computation environment 200 with a shared memory 202. The parallel computation environment 200 includes two or more processing units 204 (e.g., processors, processor cores, etc.). All processing units can run the same program. A running program is called thread, and can access the same shared memory 202. The data stored in the shared memory 202 is organized in a hierarchy, having multiple levels, where faster but smaller memory (cache) is located closer to the processing units 204.

In some implementations, a parallel hash table, or hash map, is used. In general, hash tables are used as index structures for data storage to enable fast retrieval (index lookup). The parallel hash table can be used in a parallel computation environment, where multiple concurrently running threads insert and retrieve data. Distinct operations are computed on multiple tables. The semantics of this operation is defined as: concatenate the distinct columns of all tables on which the distinct operation shall be executed, resulting in an intermediate table. On this table, the distinct operation is then applied.

Distinct can be computed by the SQL "group by" operator, which takes all the given attributes as group columns and uses COUNT on an aggregation column. All result rows with a counter>1 are duplicates. Basically, distinct is aggregation without any columns to aggregate. Therefore, the same algorithms apply. These algorithms are used in current solutions to compute the distinct operation.

A system and method are presented for calculating the distinct operation on a columnar store database. In such a database, tables are stored by column. The system and method described herein can be used for sequential and parallel distinct calculation on one or multiple tables. The algorithm differs from standard or other distinct algorithms on its new performance characteristics. The candidate set of rows which could be duplicates in the first step are reduced, and a standard duplicate check is done for a reduced candidate set.

Figure 3:
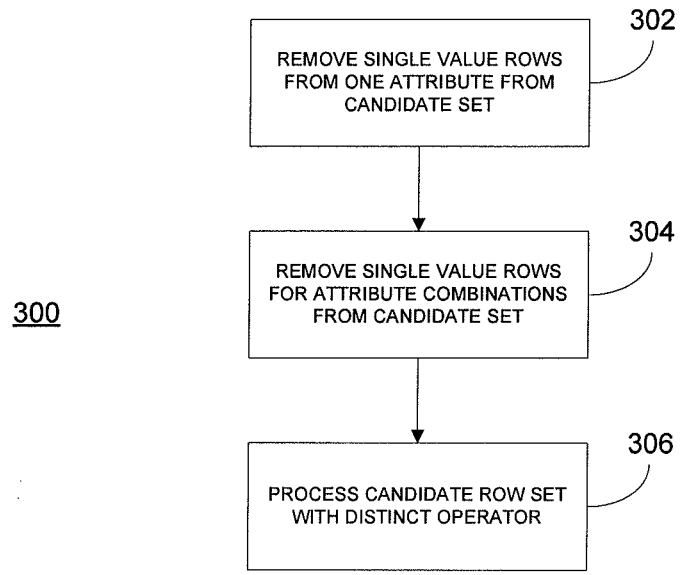
FIG. 3 is a flowchart of a method for computing a distinct algorithm on one table.

FIG. 3 is a flowchart of a method 300 for computing a distinct algorithm on one table, and based on which a method for computing an interdistinct algorithm on multiple tables can be executed. At 302, single value rows are removed from one attribute from a candidate set. The rows removed contain a value that is unique in the row set. At 304, single value rows for attribute contributions are removed from the candidate set. And at 306, the candidate row set is processed with a distinct operator. These general steps are described in further detail below.

Figure 4:
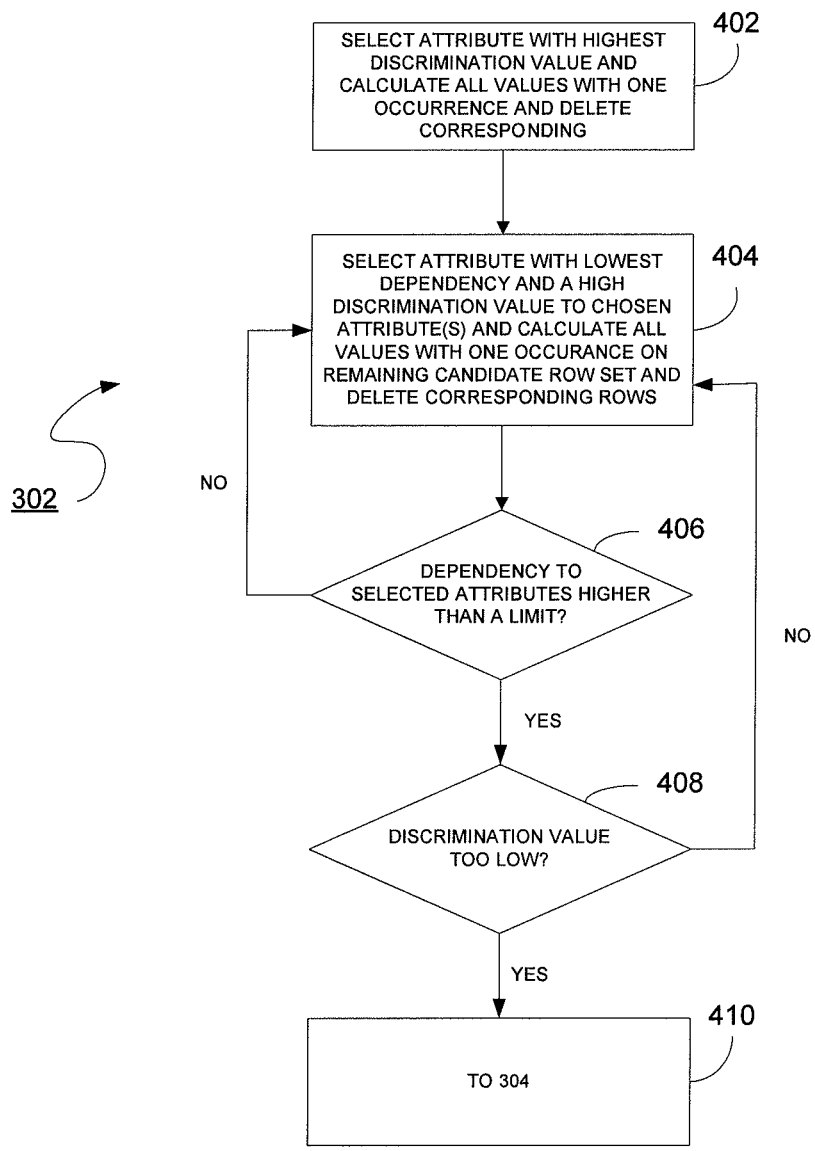
FIG. 4 is a flowchart of a steps to execute step 302 of the flowchart shown in FIG. 3.

FIG. 4 is a flowchart of steps to execute step 302 of method 300. At 402, attributes with the highest discrimination value are selected, all values with one occurrence are calculated, and the corresponding rows are deleted. At 404, the attribute with the lowest dependency and a high discrimination value to the already chosen attributes is selected, all values with one occurrence on the remaining candidate row set are calculated, and the corresponding rows are deleted. In some implementations, the dependency can be found by a correlation analysis. At 406, it is determined whether the dependency to the selected attributes is higher than a predetermined limit. If not, then the step 302 repeats at 404. If so, at 408 it is determined whether the discrimination value is too low. If not, then the step 302 repeats at 404. If so, then the step 302 continues to step 304 of method 300.

Figure 5:
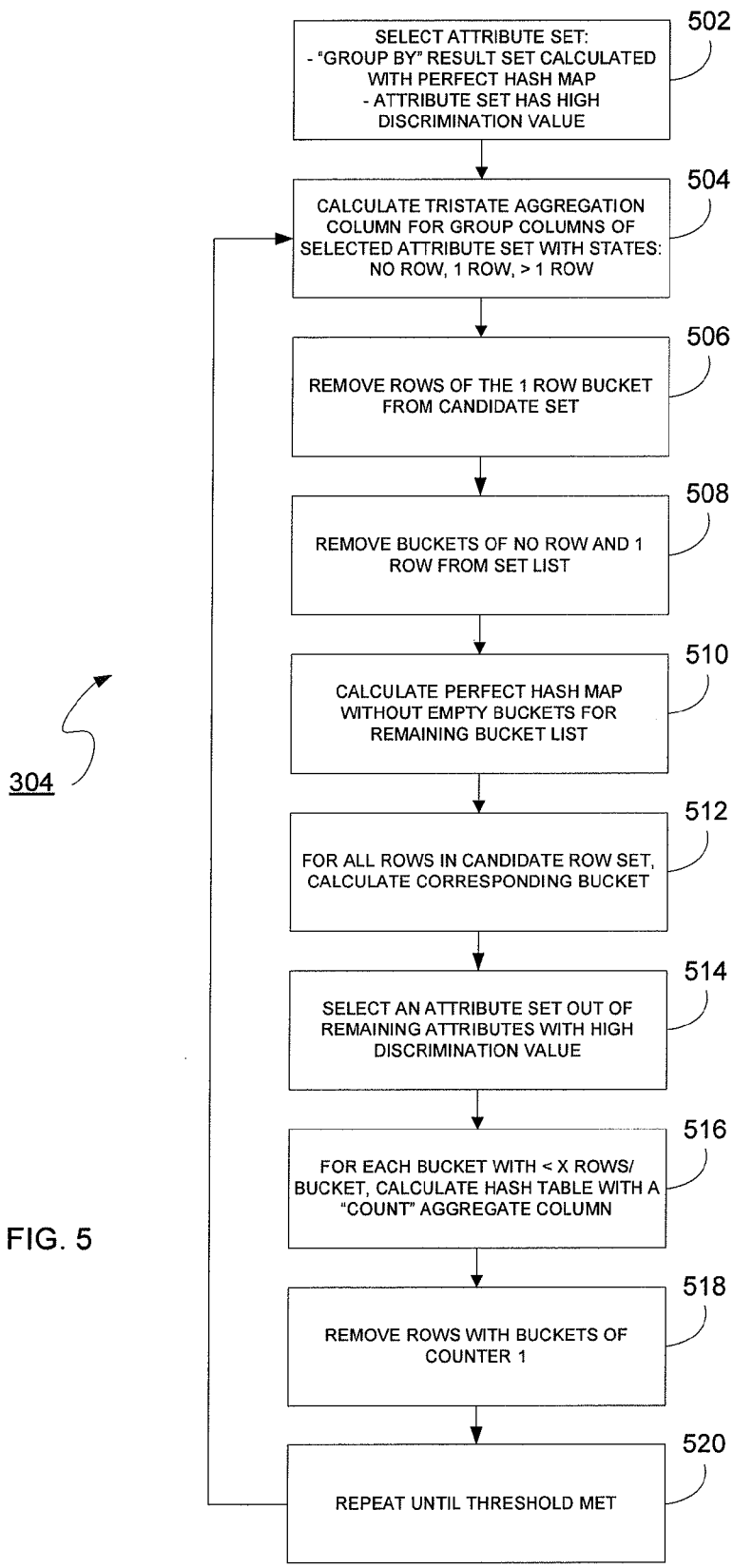
FIG. 5 is a flowchart of steps to execute step 304 of the flowchart shown in FIG. 3.

FIG. 5 is a flowchart of steps to execute step 304 of method 300. At 502 an attribute set is selected. The attribute set that is selected fulfills the following criteria: the potential "group by" result set calculated on the candidate row set can be calculated with a perfect hash map (with respect to memory consumption); and the attribute set has a high discrimination value (with respect to the candidate row set). At 504, a tristate aggregation column is calculated for the group columns of the selected attribute set with the following states: no row; exactly one row; or more than one row. Each state-based aggregation is referred to herein as a "bucket".

At 506, the rows of the "exactly one row" buckets are removed from the candidate set. At 508, the buckets with "no row" and "exactly one row" are removed from the bucket list. At 510, a perfect hash map without empty buckets is calculated for the corresponding bucket. At 512, a corresponding bucket is calculated for all rows in the candidate row set, and at 514, an attribute set with a high discrimination value is selected out of the remaining attributes. At 516, for each bucket with less than X rows per bucket, a hash table with a COUNT aggregate column is calculated. At 518 the rows with buckets of counter 1 are removed. At 520, the step repeats at 504 until a threshold is reached.

Figure 6:
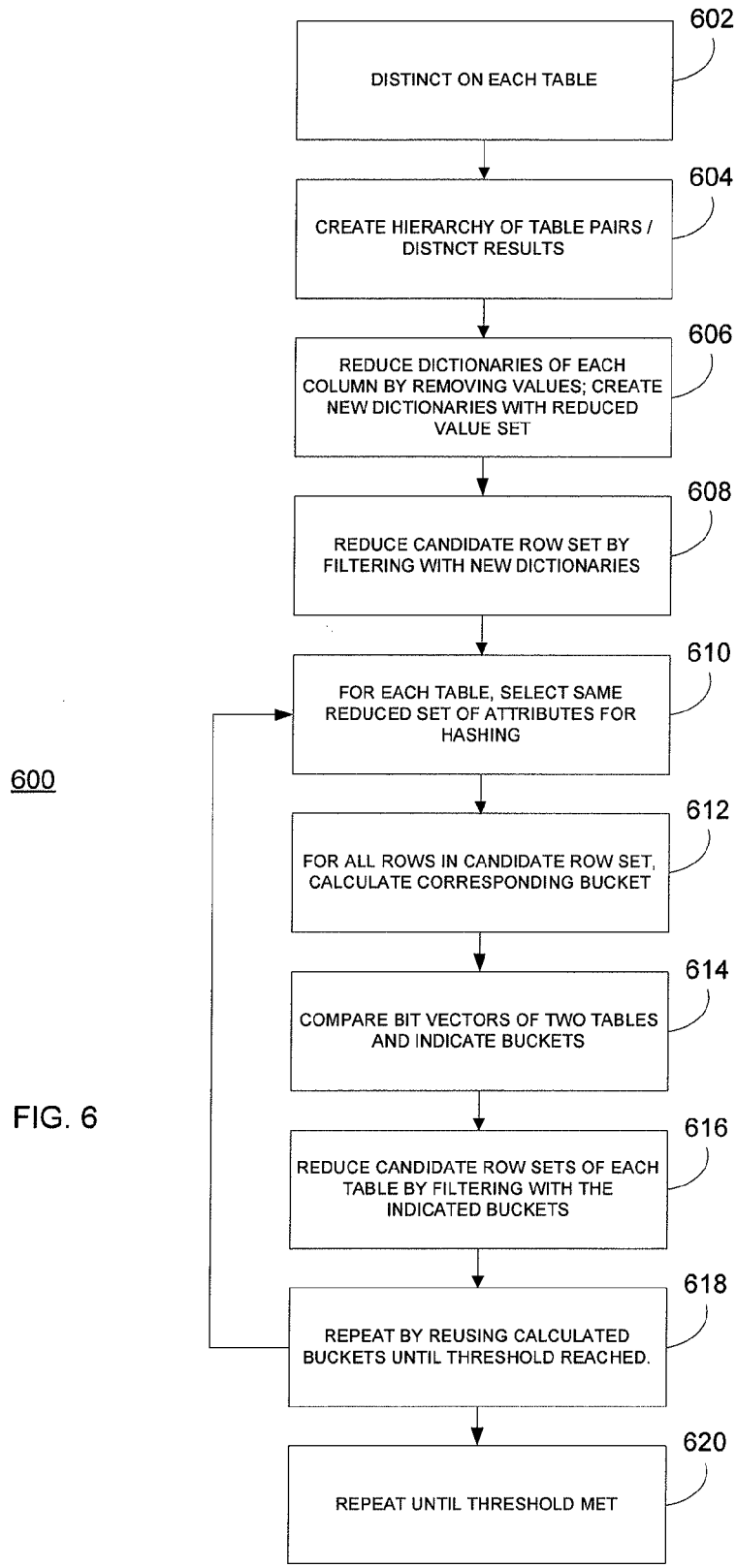
FIG. 6 is a flowchart of a method for executing an interdistinct operation.

Executing a distinct operation on multiple tables is known as an "interdistinct operation." FIG. 6 is a flowchart of a method 600 for executing an interdistinct operation. At 602 a distinct operation, as described above and illustrated in FIGS. 3-5, is performed on each table. At 604, a hierarchy of table pairs is created from the distinct results. The leaf table pairs are selected by maximizing the row number difference of the pair set. At 606, the dictionaries of each column of the two tables are reduced by removing values, which are in only one or the other table. New dictionaries are created with the reduced value set. A dictionary is a data structure in column-oriented database systems—it contains all values of a column. At 608, the candidate row set is reduced by filtering with the new dictionaries.

At 610, for both tables, the same reduced set of attributes is selected with high discrimination value and low dependency, which can be hashed into a collision-free hash table. At 612, a hash table of the candidate row set is created by using the new dictionary positions as hash values. The bucket of the hash table is one bit, which indicates, if the bucket is used. At 614, the bucket sets (bit vectors) of the two tables are compared, to indicate which buckets are just used in one or the other table. At 616, the candidate row set of each table is reduced by filtering with the indicated buckets. At 618, steps 610 through 616 are re-executed by reusing the calculated buckets until a threshold is reached. The threshold is either a low level of row set reduction of a small set of candidate row sets. At 620, a duplicate detection on the reduced row set is performed, as described above.

The methods and system described herein can be parallelized by usage of parallel hash map for the hash tables mentioned above, with parallelization by dynamic vertical partitioning, or with parallelization by parallel table pair handling the multiple-tables algorithm.

Some or all of the functional operations described in this specification can be implemented in digital electronic circuitry, or in computer software, firmware, or hardware, including the structures disclosed in this specification and their structural equivalents, or in combinations of them. Embodiments of the invention can be implemented as one or more computer program products, i.e., one or more modules of computer program instructions encoded on a computer readable medium, e.g., a machine readable storage device, a machine readable storage medium, a memory device, or a machine-readable propagated signal, for execution by, or to control the operation of, data processing apparatus.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, that is generated to encode information for transmission to suitable receiver apparatus.

A computer program (also referred to as a program, software, an application, a software application, a script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to, a communication interface to receive data from or transfer data to, or both, one or more mass storage devices for storing data, e.g., magnetic, magneto optical disks, or optical disks.

Moreover, a computer can be embedded in another device, e.g., a mobile telephone, a personal digital assistant (PDA), a mobile audio player, a Global Positioning System (GPS) receiver, to name just a few. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Certain features which, for clarity, are described in this specification in the context of separate embodiments, may also be provided in combination in a single embodiment. Conversely, various features which, for brevity, are described in the context of a single embodiment, may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments of the invention have been described. Other embodiments are within the scope of the following claims. For example, the steps recited in the claims can be performed in a different order and still achieve desirable results. In addition, embodiments of the invention are not limited to database architectures that are relational; for example, the invention can be implemented to provide indexing and archiving methods and systems for databases built on models other than the relational model, e.g., navigational databases or object oriented databases, and for databases having records with complex attribute structures, e.g., object oriented programming objects or markup language documents. The processes described may be implemented by applications specifically performing archiving and retrieval functions or embedded within other applications.

The invention claimed is:

1. A computer-implemented method comprising:
executing a distinct operation on each table of a plurality of tables shared by a plurality of processing units in a parallel computing environment, each table comprising a plurality of rows and a plurality of columns, each column comprising values of a corresponding attribute of a plurality of attributes, each distinct operation eliminating duplicate data from the plurality of columns in each table, an order in which a column of each table is selected for removal of the duplicate data being based on a discrimination value of an attribute specific to the column and on a dependency metric characterizing dependency between the attribute specific to the column and one or more attributes specific to other one or more columns from which duplicate data has previously been removed, the executing creating a hierarchy of table pairs and distinct results, the distinct results comprising a reduced row set for each table, at least one table pair of the table pairs having a maximum row number difference between two corresponding tables of the at least one table pair; and
detecting duplicates on each reduced row set to complete the distinct operation on the plurality of tables,
the executing and detecting being performed by one or more processors.

2. The computer-implemented method in accordance with claim 1, further comprising executing, by the one or more processors and for each table pair in the hierarchy of table pairs:
removing values that exist in one or the other table to generate a reduced value set;
generating new dictionaries for each column in the table pair with the reduced value set, the new dictionaries comprising one or more data structures including values of each column;
defining a candidate row set from the reduced value;
generating a hash table of the candidate row set based on the new dictionaries as hash values; and
reducing the candidate row set by filtering bit vectors of the hash table to generate the reduced row set.

3. The computer-implemented method in accordance with claim 2, wherein reducing the candidate row set includes filtering with the new dictionaries.

4. The computer-implemented method in accordance with claim 2, wherein the reduced value set comprises a reduced set of attributes with high discrimination value and low dependency between tables of the table pair.

5. The computer-implemented method in accordance with claim 4, wherein the reduced set of attributes are hashed into a collision-free hash table.

6. The computer-implemented method in accordance with claim 1, wherein the dependency metric characterizing the dependency is determined by performing a correlation analysis.

7. A computer program product comprising a machine-readable medium storing instructions that, when executed by at least one programmable processor, cause the at least one programmable processor to perform operations comprising:

executing a distinct operation on data associated with each table of a plurality of tables shared by a plurality of processing units, each table comprising a plurality of rows and a plurality of columns, the data arranged in a first hierarchy based on speed and size of each memory unit storing the data and on distance from a corresponding processing unit, each distinct operation eliminating duplicate data from the plurality of columns in each table, the executing creating a second hierarchy of table pairs and distinct results, the distinct results comprising a reduced row set for each table, at least one leaf table pair of the table pairs having a maximum row number difference between two tables of the at least one leaf table pair; and detecting duplicates on each reduced row set to complete the distinct operation on the plurality of tables.

8. The computer program product in accordance with claim 7, wherein the instructions further comprise, for each table pair in the second hierarchy of table pairs, operations to:

remove values that exist in one or the other table to generate a reduced value set;

generate new dictionaries for each column in the table pair with the reduced value set;

define a candidate row set from the reduced value;

generate a hash table of the candidate row set based on the new dictionaries as hash values; and reduce the candidate row set by filtering bit vectors of the hash table to generate the reduced row set.

9. The computer program product in accordance with claim 8, wherein the operation to reduce the candidate row set includes on operation to filter with the new dictionaries.

10. The computer program product in accordance with claim 8, wherein the reduced value set comprises a reduced set of attributes with high discrimination value and low dependency between tables of the table pair.

11. The computer program product in accordance with claim 10, wherein the reduced set of attributes are hashed into a collision-free hash table.

12. The computer program product of claim 7, wherein each column of each table comprises values of a corresponding attribute of a plurality of attributes, an order in which a column of each table is selected for removal of the duplicate data is based on a discrimination value of an attribute associated with the column and on a dependency metric characterizing dependency between the attribute associated with the column and one or more attributes associated with other one or more columns from which duplicate data has previously been removed.

13. A system comprising:

at least one programmable processor; and a machine-readable medium storing instructions that, when executed by the at least one processor, cause the at least one programmable processor to perform operations comprising:

executing a distinct operation on each table of a plurality of tables shared by a plurality of processing units performing parallel processing, each table comprising a plurality of rows and a plurality of columns, each column comprising values of a corresponding attribute of a plurality of attributes, each distinct operation eliminating duplicate data from the plurality of columns in each table, an order in which a column of each table is selected for removal of the duplicate data being based on a discrimination value of an attribute associated with the column and on a dependency metric characterizing dependency between the attribute associated with the column and one or more attributes associated with other one or more columns from which duplicate data has previously been removed, the executing creating a hierarchy of table pairs and distinct results, the distinct results comprising a reduced row set for each table, at least one table pair of the table pairs having a maximum row number difference between two corresponding tables of the at least one table pair; and detecting duplicates on each reduced row set to complete the distinct operation on the plurality of tables.

14. The system in accordance with claim 13, wherein the operations further comprise, for each table pair in the hierarchy of table pairs:

removing values that exist in one or the other table to generate a reduced value set;

generating new dictionaries for each column in the table pair with the reduced value set;

defining a candidate row set from the reduced value;

generating a hash table of the candidate row set based on the new dictionaries as hash values; and reducing the candidate row set by filtering bit vectors of the hash table to generate the reduced row set.

15. The system in accordance with claim 14, wherein reducing the candidate row set includes filtering with the new dictionaries.

16. The system in accordance with claim 14, wherein the reduced value set comprises a reduced set of attributes with high discrimination value and low dependency between tables of the table pair.

17. The system in accordance with claim 16, wherein the reduced set of attributes are hashed into a collision-free hash table.

* * * * *